United States Patent [19]

Matthes et al.

[11] 4,028,608

[45] June 7, 1977

[54] BRIDGE CIRCUIT ARRANGEMENT ON ELECTRICAL FREQUENCY CONVERTERS WHICH CAN BE FED WITH A D.C. CURRENT

[75] Inventors: Hans Matthes; Erhard Mauler, both of Wermelskirchen, Germany

[73] Assignee: AEG-Elotherm G.m.b.H., Remscheid, Germany

[22] Filed: Feb. 19, 1976

[21] Appl. No.: 659,403

[30] Foreign Application Priority Data

Feb. 20, 1975 Germany .......................... 2507316

[52] U.S. Cl. .............................................. 321/8 R
[51] Int. Cl.[2] ...................................... H02M 7/00
[58] Field of Search .......... 317/100; 321/8 R, 27 R, 321/45 R

[56] References Cited

UNITED STATES PATENTS

| 3,048,766 | 8/1972 | Panzer | 321/8 R X |
| 3,081,424 | 3/1963 | Dortort | 321/27 R X |

*Primary Examiner*—William M. Shoop
*Attorney, Agent, or Firm*—Cushman, Darby & Cushman

[57] ABSTRACT

A bridge circuit of the type whereby a plurality of individual switching elements such as thyristors are mounted in a frame between four contact rails. To minimize interaction between current flow in the elements and to cause the load current to be divided roughly evenly over the elements, the elements are physically mounted between the rails so that adjacent parallel mounted elements belong to different arms and do not carry current at the same time.

3 Claims, 2 Drawing Figures

BRIDGE CIRCUIT ARRANGEMENT ON ELECTRICAL FREQUENCY CONVERTERS WHICH CAN BE FED WITH A D.C. CURRENT

The invention relates to a bridge circuit for an electrical frequency converter which can be fed with direct current.

In known units of this type, four contact rails form a frame onto which a number of sets of semiconductor elements comprising the bridge are attached. The circuit is formed of four arms, each arm usually having many individual switching elements connected in parallel. Preferably thyristors are mounted in a position such that in one quarter of the frame field the thyristors of one arm of the bridge, which are electrically connected in parallel with each, are physically disposed in parallel to each other with respect to their paths of current flow. In a second quarter of the frame field lie the paths of current flow of the bridge elements of a second arm, in another quarter the elements of the third and finally in a fourth part the paths of current flow of the fourth arm of the bridge, all in corresonding arrangements so that always one quadrant of frame field is assigned to one arm of the bridge with switching elements arranged there, which are disposed in a parallel connection.

In this arrangement, it is shown — independently of the position of the input and outputs along the length of the assigned contact rails — that the feeder currents and load currents are not distributed evenly over the individual semiconductor circuit elements of an arm of a bridge, even if the individual semiconductor circuit elements are electrically selected and matched for uniformity of electrical characteristics. The distribution of the load and feeder currents over the individual paths of the current flow of each arm is such at the same time, that the semiconductor switches of adjacent quadrants belong to variable arms of bridges in a locally adjacent position, absorb a higher current than the semiconductor switches, which belong to these two arms of bridges in a position which is locally distant from one another. As the cause of this phenomenon one must consider the electromagnetic interaction between the paths of current flow of the individual bridge arms which are mounted in the frame. This phenomenon, which is insignificent in the case of a relatively small number of semiconductor switches which are switched in parallel in an arm of a bridge, becomes a problem when a larger number of semiconductor switches are used. This occurs because the uneven distribution of current over the path of the current flow of the frame must be taken into consideration, especially in the case of replacement of semiconductor switching elements which have become unusable. Moreover close dimensioning of the bridge circuit becomes necessary and this causes higher production costs.

It is the object of this invention to eliminate this indicated phenomenon and to arrange the switching elements so that the load current of the bridge circuit is divided evenly over the individual switching elements of the bridge arms. This is accomplished in a bridge circuit which can be fed with a direct current or undulating current of the type discussed above, in that the semiconductor elements are disposed in the frame of the four rails in such a way, that locally adjacent paths of current flow always belong to different arms of the bridge adjacent to the feeder rails of the bridge. Thus, current does not flow through adjacent switches at the same time and interaction is minimized. Accordingly the individual semiconductor circuit elements switched in parallel in the arms of the bridge are no longer disposed locally adjacent in the bridge circuit, but the entire circuit arrangement is made in such a way, that complete bridge circuits, the number of which corresponds to the number of switching elements that are to be switched in parallel, are switched in parallel among themselves in a local position side by side.

Referring to the drawings.

Figure 1:
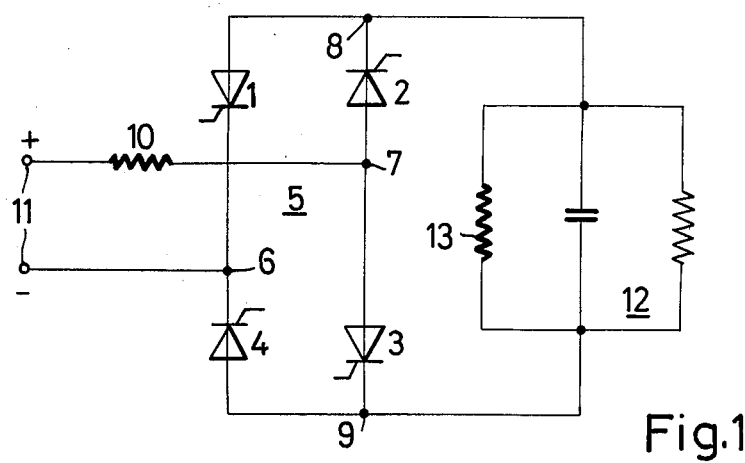
FIG. 1 shows a prior art electrical circuit.

In FIG. 1, the numbers 1, 2, 3 and 4 each designate semiconductor switches such as thyristors, which are conventionally connected in a bridge circuit 5 with feeder connections 6 and 7 and load current discharge connections 8 and 9. The two feeder connections 6 and 7 of the bridge circuit can be connected by way of a throttle or coil 10 with a D.C. voltage source 11, which consists e.g. of a controlled three-phase current bridge circuit which is in turn connected with the three-phase mains. The two take-off connections 8 and 9 for the load current of the bridge circuit 5 are connected with a parallel oscillating circuit 12, the inductance 13 of which e.g. is the coil of an installation for the inductive heating of electrically conductive workpieces, such as metallic ends of a pipe.

Thyristors 1, 2, 3 and 4 are controlled by way of a control arrangement, not shown, in a known manner such that arms of the bridge lying diagonally opposite one another in the bridge circuit 5 are always fired synchronously. At the same time, the firing times of the adjacent arms of the bridge are always phase shifted electrically in relation to one another by 180°, so that an alternating current is fed to the load 12, the frequency of which is determined by the control cycle of the thyristors of bridge circuit 5.

Figure 2:
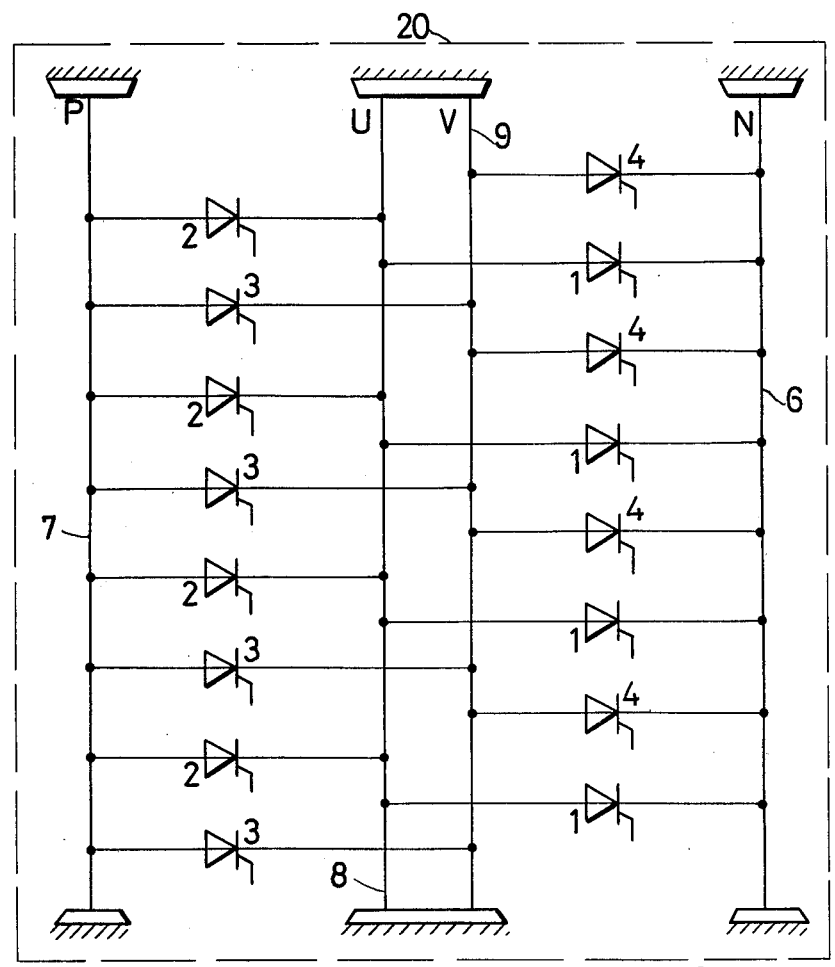
FIG. 2 shows one embodiment according to the circuit of this invention with several semiconductor switches in each arm of the bridge in parallel according to a schematic presentation of the construction.

Referring to FIG. 2, a switching cabinet 20 houses in its upright position four copper contact rails 6, 7, 8 and 9 running essentially parallel to one another and disposed in one plane. The four contact rails are always assigned individually to the four corner points of the bridge circuit arrangement shown in FIG. 1 and for that reason have been assigned the same numbers. They are attached to the cabinet 20 at a distance from one another and are electrically insulated from one another in the inside of the cabinet 20, so that they line up essentially in a plane. The two load rails 8 and 9 are disposed at a relatively close distance side by side in a parallel position to one another between the two feeder rails 6 and 7.

For the build-up of the bridge circuit shown in FIG. 1, with the use of four thyristors electrically switched in parallel, in each of the four arms of the bridge, the individual thyristors are inserted into the field of the frame of the four contact rails such that in the field of the frame locally adjacent or parallel running paths of current flow which always contain one thyristor interchange with one another in such a way, that locally directly adjacent paths of current flux always belong to an arm of the bridge adjacent to the feeder point of the bridge 5. Thus, for example in the left field of the frame shown, the thyristors 2 of the arm of the bridge located between the bridge points 7 and 8 are disposed alternately with the thyristors 3 of the arm of the bridge located between the bridge points 7 and 9. In the right-hand field of the frame thyristors 4 of the arm of the bridge located between the bridge points 6 and 9, interchange with the thyristors 1 of the arm of the bridge located between the points 6 and 8.

Therefore, the overall arrangement is such that directly adjacent switches are always conductive at different times — if one disregards the point in time of the commutation.

As a result of this development — as it has turned out — symmetrical conditions result in the frame shown in such a way, that independently of the position of the local feeder connecting $p$ and $n$ of the two contact rails 7 and 6 along the length of the rails and independently of the position of the load current take-off connections $u$ and $v$ along the length of the load rails 8 and 9, the distribution of the current over the semiconductor circuit elements 1, 2, 3 and 4 assigned to the individual arms of the bridge is essentially uniform. Insignificant remaining differences result only from the electrical frequencies of the switching elements themselves and not from the position of these switching elements in the entire switching field stepped up by the four contact rails. Experience has shown that the invention is of significance particularly in those cases whenever more than four semiconductor circuit elements are disposed in one arm of the bridge of the circuit arrangement.

Many changes and modifications of the above described embodiment can be carried out. For example, the two feed rails 6 and 7 can be exchanged with load rails 8 and 9. Further any suitable arrangements can be used to connect the switching elements to the rails. As another alternative, it is within the scope of the invention to dispose the four rails which are assigned to the corner points of the bridge not in one plane but spatially displaced in relation to one another.

What is claimed is:

1. In a bridge circuit for an electric frequency converter that can be fed with direct current for converting direct current into alternating current comprising:
    four contact rails,
    means for mounting said rails substantially in parallel to one another and insulated electrically from one another to form a mechanical frame,
    said rails forming four corner points of the bridge circuit, two of which as feed rails can be connected with a source of direct current and two of which as load rails can be connected with an output of the frequency converter,
    four $n$ controllable semiconductor switches $n$ of which are always switched conductive in an arm of the bridge circuit in an electrical parallel circuit and are attached at a distance from one another to said contact rails so that between the rails in the plane of said rails, essentially parallel paths of the current flow via the semiconductor switches,
    the improvement wherein said semiconductor switches are disposed in the frame of said four rails in such a way that locally adjacent and parallel running paths of the current flow always belong to different arms of the bridge and to arms of the bridge which are adjacent to the two feeder points of the bridge.

2. In a bridge circuit as in claim 1, which can be fed with direct current, the further improvement wherein two load rails are disposed side by side between the two feeder rails essentially in parallel to one another in one plane.

3. A circuit as in claim 1 wherein said switches are thyristors.

* * * * *